United States Patent [19]

Saito et al.

[11] 4,025,929

[45] May 24, 1977

[54] EXPOSURE TIME CONTROL DEVICE OF ELECTRIC SHUTTER FOR CAMERA CAPABLE OF AUTOMATIC AND MANUAL SETTINGS

[75] Inventors: Takeo Saito; Youichi Seki, both of Chiba, Japan

[73] Assignee: Seiko Koki Kabushiki Kaisha, Japan

[22] Filed: Aug. 23, 1974

[21] Appl. No.: 499,995

[30] Foreign Application Priority Data

Aug. 24, 1973 Japan .............................. 48-95007

[52] U.S. Cl. ............................... 354/50; 354/23 D; 354/60 A

[51] Int. Cl.² .......................................... G03B 7/08

[58] Field of Search .......... 354/23 D, 50, 51, 60 R, 354/60 A, 60 L

[56] References Cited

UNITED STATES PATENTS

| | | | |
|---|---|---|---|
| 3,348,462 | 10/1967 | Fahlenberg | 354/23 D |
| 3,748,979 | 7/1973 | Wada | 354/23 D |
| 3,824,608 | 7/1974 | Toyoda | 354/23 D |
| 3,827,065 | 7/1974 | Wada | 354/23 D |
| 3,836,262 | 9/1974 | Yata et al. | 354/23 D |
| 3,843,265 | 10/1974 | Egli et al. | 354/23 D |

FOREIGN PATENTS OR APPLICATIONS 45-4903   2/1970   Japan .............................. 354/23 D

OTHER PUBLICATIONS

TTL Cookbook, Don Lancaster, 1974, p. 208.

*Primary Examiner*—Russell E. Adams, Jr.
*Attorney, Agent, or Firm*—Robert E. Burns; Emmanuel J. Lobato; Bruce L. Adams

[57] ABSTRACT

A shutter control circuit including a brightness-time conversion circuit for developing an output pulse having a duration representative of exposure time, and a standard pulse generating circuit for generating standard pulses at a certain rate. A reversible counter operable in an addition mode and a subtraction mode counts the standard pulses for the duration of the output pulse of the brightness-time conversion circuit so that the number of counted pulses is representative of exposure time. The reversible counter is then operated in a subtraction mode to read-out the counted pulses to control exposure time. The shutter control circuit further includes circuitry for operating the counter in the addition mode and for applying a selectable number of standard pulses to the reversible counter in order to determine exposure time. When the brightness-time conversion circuit controls the number of standard pulses counted, the control circuit is operative in an automatic mode, and when the number of standard pulses counted are manually selected the control circuit is operative in a manual mode. The shutter control circuit also includes circuitry for reducing the duration of the output pulse of the brightness-time conversion circuit substantially to zero so that the brightness-time conversion circuit is rendered ineffective to determine the exposure time when the shutter control circuit is operated in the manual mode.

2 Claims, 9 Drawing Figures

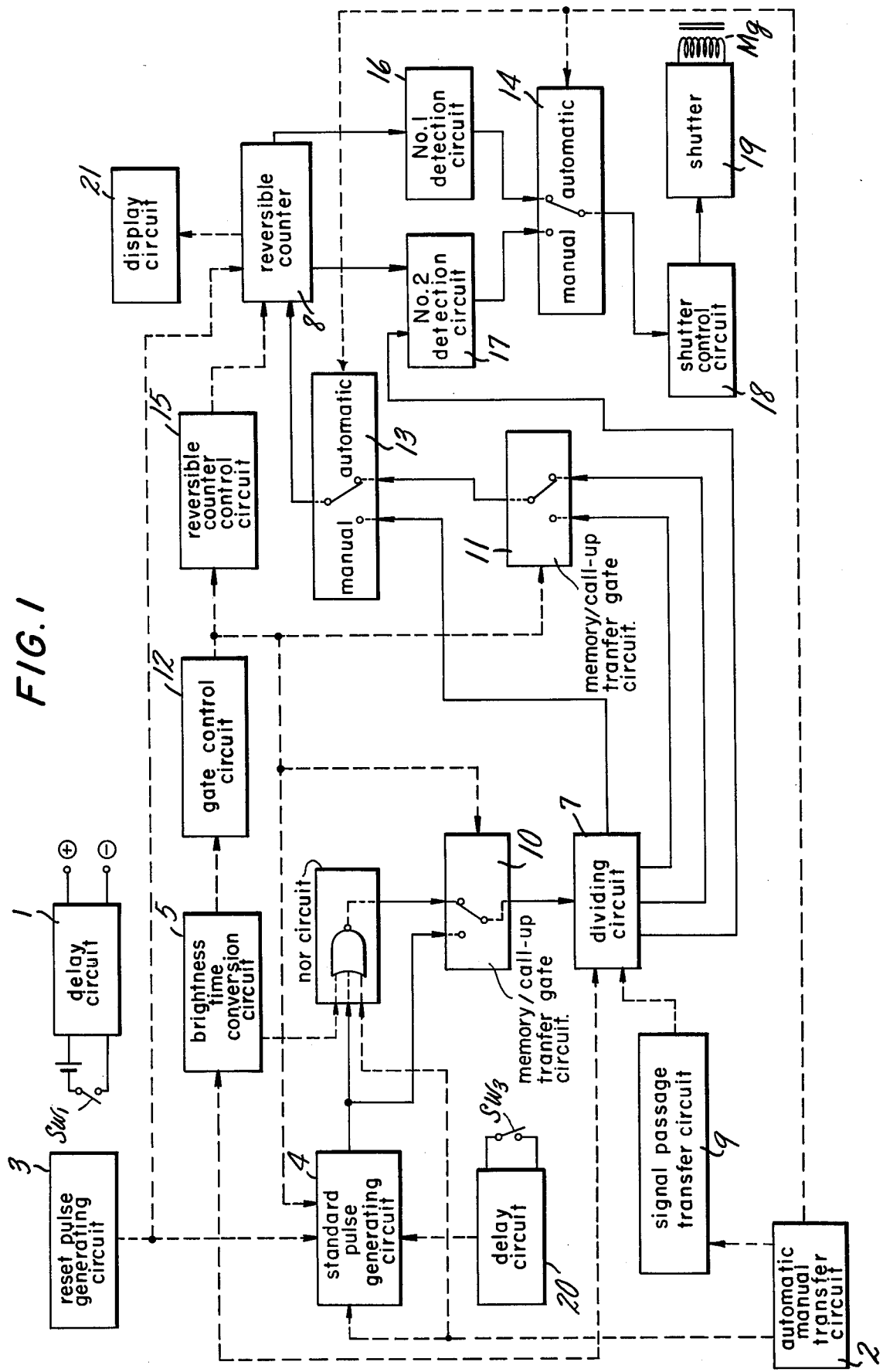

EXPOSURE TIME CONTROL DEVICE OF ELECTRIC SHUTTER FOR CAMERA CAPABLE OF AUTOMATIC AND MANUAL SETTINGS

BACKGROUND OF THE INVENTION

The present invention relates to a shutter control circuit for a camera, and more particularly to a shutter control circuit which is operable in an automatic mode and in a manual mode.

Camera shutter control circuits are known. Automatic shutter control circuits include circuitry responsive to the brightness of a scene to be photographed for automatically setting the exposure time in accordance with the brightness of a scene. Such shutter control circuits generally include a pair of counters. A first counter counts a number of pulses representative of exposure time and the second counter counts pulses during the exposure time. When the number of pulses counted by the second counter equals the number of pulses counted by the first counter, the exposure is terminated. There is also known similar shutter control circuits which operate in a manual mode. In these circuits the number of pulses counted by the first counter is manually set, rather than being determined by the brightness of a scene to be photographed. It would be advantageous to be able to operate the same control circuit in both modes of operation, and to reduce the number of components required to manufacture the circuit.

SUMMARY OF THE INVENTION

It is an object of the present invention to provide a shutter control circuit which operable in both an automatic mode and a manual mode for controlling exposure time. It is another object of the invention to provide a shutter control circuit, operable in both a manual and an automatic mode, which includes only a single counter circuit.

The shutter control circuit according to the invention includes a brightness-time conversion circuit for developing an output pulse having a duration representative of an exposure time. A standard pulse generating circuit generates standard pulses at a certain rate which are counted by a reversible counter which is operable in an addition mode for counting the standard pulses and which is operable in a subtraction mode for reading-out the counted pulses. The control circuit includes first means for enabling the counter in the addition mode and for applying standard pulses to the counter for the duration of the rightness-time conversion circuit output pulse so that the number of standard pulses counted is representative of an exposure time. The exposure time is controlled by means for enabling the counter in the substraction mode and reading-out the number of standard pulses counted to control this exposure time. The control circuit is operated in the manual mode by second means for enabling the counter in the addition mode and operable for applying a selectable number of standard pulses to the reversible counter, and means for enabling the counter in a subtraction mode and for reading-out the selected number of standard pulses counted to control the exposure time. The brightness-time conversion circuit comprises means coactive with the second means for reducing the duration of the output pulse of the brightness-time circuit substantially to zero so that the brightness-time conversion circuit is rendered ineffective to determine the exposure time during the manual mode of operation.

BRIEF DESCRIPTION OF THE DRAWINGS

FIG. 1 is a block diagram illustrating the structure of the shutter control circuit according to the invention;

DESCRIPTION OF THE PREFERRED EMBODIMENT

Figure 2A:
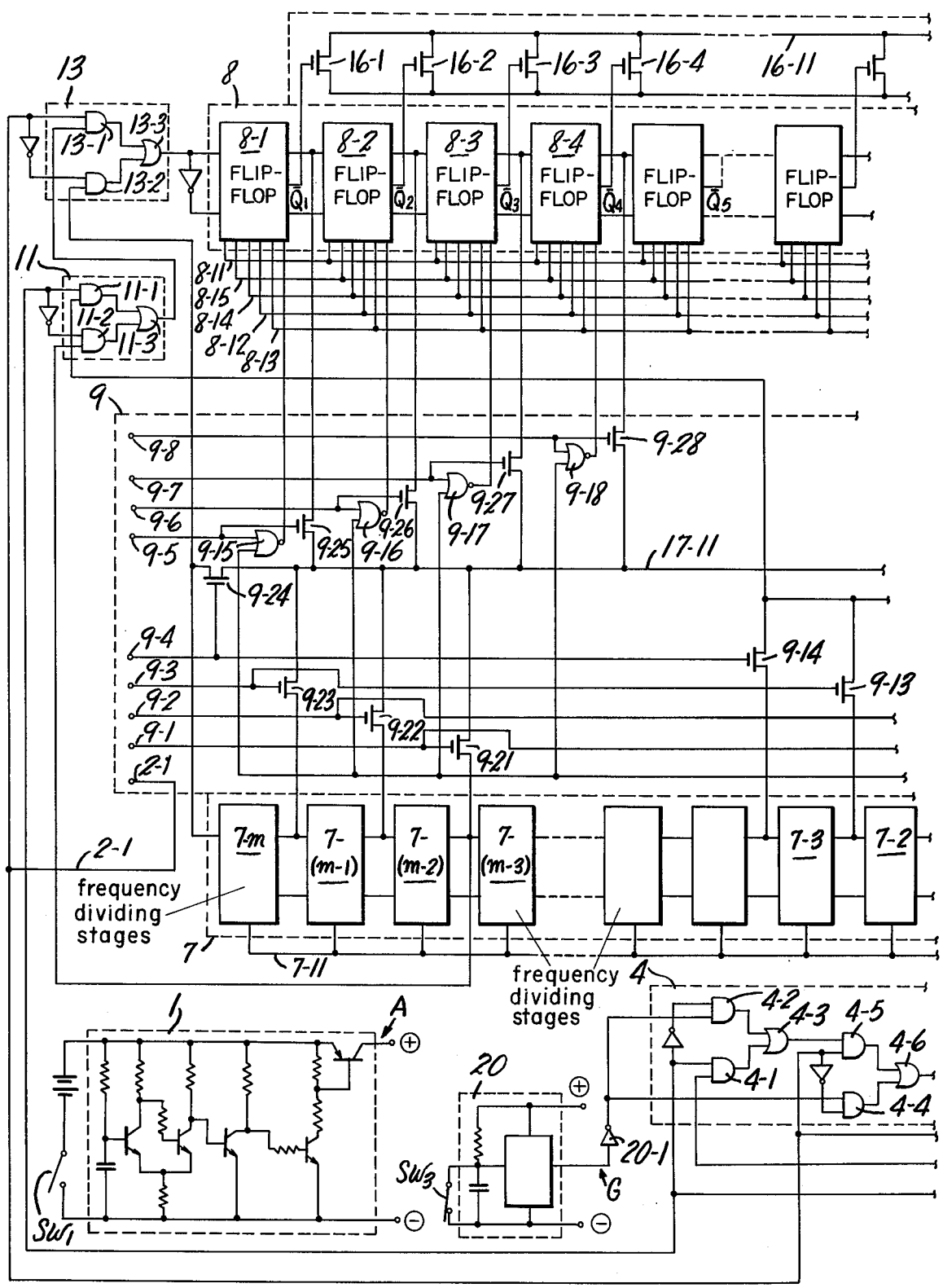
FIGS. 2a and 2b illustrate a detailed schematic diagram of the shutter control circuit according to the invention.

An explanation is now given of the operation of a preferred embodiment of the invention illustrated in the drawings. FIG. 1 is a schematic diagram of this embodiment, in which SW1 is a power swtich which is closed by depressing the camera release button, and which completes the power circuit through delay circuit 1. Automatic/manual transfer circuit 2 includes change-over switches to select either the automatic setting mode for exposure time or the manual setting mode for exposure time. The reset pulse generating circuit 3 generates reset pulses in synchronization with current power. The standard pulse generating circuit 4 generates standard pulses at a constant frequency. The brightness/time conversion circuit 5 measures the intensity of light transmitted through the photographing lens with a photoconductive cell (such as Cd5) and generates single pulses having pulse widths which corresponded to the brightness of a subject, when the time of exposure is to be set automatically. (The automatic setting of exposure time is referred to as the automatic setting mode and the manual setting of exposure time as the manual setting mode hereafter). In the case of the automatic setting mode, standard pulses generated by the standard pulse generating circuit 4 are permitted to pass through the NOR circuit 6 during the duration of single pulses generated by the brightness/time conversion circuit 5. The frequency dividing circuit 7, in case of the automatic setting mode introduces factors or parameters for determining the time of exposure other than the brightness of a subject at the time of memorizing and demultiplies standard pulses through only its preset stages at the time of call-up and, in case of manual setting delivers standard pulses as inputs to the reversible counter 8 after they pass through all of the stages and are demultiplied.

The reversible counter 8 adds and memorizes the number of input pulses when the addition control signal is applied by the reversible counter control circuit 15 to the counter 8, and subtracts from the memorized number of pulses the number of input pulses when the subtraction signal, is aplied by counter control circuit 15. Signal passage transfer circuit 9 is provided with a plurality of control terminals which, in the case of the automatic setting mode, is employed to introduce factors for determining the time of exposure other than the brightness of a subject and which, if the control terminal is selected according to the above-said factor, delivers standard pulses between the counting stages of reversible counter 8 or through frequency dividing circuit 7 to the reversible counter 8 in response thereto. In the case of the manual setting mode, if a control terminal is selected corresponding with the manual set value, it sends standard pulses demultipied through the frequency dividing circuit 7 and reversible counter 8 from frequency dividing circuit 7 or from the reversible counter 8 to the No. 2 detection circuit. Memory/call-up transfer gate circuits 10 and 11 are controllable by gate control circuit 12 and are the circuits that transfer the paths along which pulses pass at the time of memorizing and call-up, and they are changed over to a pulse path at the time of call-up in the case of the manual setting mode which does not include memory actuation.

The gate circuit is for generating signals that control the memory/call-up transfer gate circuits 10 and 11. Automatic/manual transfer gate circuits 13 and 14 are for changing pulse paths at the time of automatic setting and at the time of manual setting and are controllable by automatic/manual transfer circuit 2. The reversible counter control circuit 15 is controllable by signals from the gate control circuit 12 for applying addition control signals or subtraction control signals to the reversible counter 8. The No. 1 detection circuit 16 detects the time at which the memory value of reversible counter 8 becomes zero, in the case of the automatic setting mode, thereby generating a shutter closing signal. The No. 2 detection circuit 17 generates a shutter closing signal in the case of the manual setting mode, when it detects the number of pulses corresponding to the value set by manual setting. Shutter control circuits 18 controls the shutter 19 which includes an electromagnet Mg. Display circuit 21 is for displaying shutter speed corresponding with the memory value memorized by the reversible counter 8 in the case of the automatic setting mode.

A description is given below of the operation of this embodiment. In the case of the automatic setting mode, if the setting is made to automatic in the automatic/-manual transfer circuit, then the pulse path for automatic setting is selected by the automaticmanual transfer gate circuits 13, 14. When power supply switch SW1 is closed by depressing the camera release button current is supplied to the whole system after a lapse of time determined by delay circuit 1. An addition control signal is applied from reversible counter control circuit 15 to reversible counter 8, and simultaneously the reversible counter 8 and frequency dividing circuit 7 are then reset by reset pulses generated by the reset pulse generating circuit 3. Also standard pulses generated by the standard pulses generating circuit 4 by the trailing edge of the reset pulse pass through NOR circuit 6 and memory/call-up transfer gate circuit 10 during the duration of single pulses generated by the brightness/time conversion circuit 5. The standard pulses are demultiplied by the signal passage transfer circuit 9 in accordance with factors for determining the time of exposure other than the brightness of a subject, such as film sensitivity, diaphragm aperture, etc. They are also added or memorized by the reversible counter 8 through the memory/call-up transfer gate circuit 11 and the automatic/manual transfer circuit 13 or they are added and memorized directly by reversible counter 8 under control of the signal passage transfer circuit 9. The memory value so memorized controls the display circuit 21 which displays the shutter speed. Single pulses from the brightness/time conversion circuit control the gate control circuit 12 by their trailing edge, and memory/call-up transfer gate circuits 10, 11 transfer the memory/call-up transfer signals, generated under control of gate control circuit 12, to simultaneously control reversible counter control circuit 15 by applying subtraction control signals to the reversible counter 8 to put it in the state ready for controlling operation, thereby stopping the occurrence of standard pulses of the standard pulse generating circuit 4. Operations up to this point are made, in a single-lens reflux camera, before the reflector of the finder rises after the camera release button is depressed and the light falling on the photoconductive cell is interrupted. If the shutter starts opening upon further depressing of the camera release button timing switch SW3 is opened by shutter blade opening member (not shown) and, after an elapse of a given time determined by delay circuit 20, the standard pulses are again generated and the shutter speed being displyed by the display circuit 21 is reset.

The standard pulses generated again pass along memory/call-up transfer gate circuit 10, and after being demultiplied by frequency dividing circuit 7, are applied to reversible counter 8 through memory/call-up transfer gate circuit 11 and automatic/manual transfer gate circuit 13. The standard pulses are subtracted from the memory values stored in the reversible counter 8 and when the memory value becomes zero, the No. 1 detection circuit 16 detects this condition. The shutter closing signal generated in the No. 1 detection circuit 16 control shutter control circuit 18, interrupts the current of electromagnet Mg locking the shutter blade closing member (not shown) of shutter 19 and releases the shutter blade closing member, thus closing the shutter 19, when operating in the manual setting mode. Automatic/manual transfer gate circuits 13, 14 are transferred to the pulse paths at the time of manual setting upon selection of the manually set value and reversible counter 8 is connected to the frequency dividing circuit 7. The standard pulses to be generated in the standard pulse generating circuit 4 are delivered as inputs to the reversible counter 8 after passing through all of the stages of the frequency dividing circuit 7. Display circuit 21 is constructed so that no display is made at the time of manual setting as described later. If power switch SW1 is closed by depressing the camera release button, an addition control signal is applied to the reversible counter 8 by the reversible counter control circuit 15.

Then the reversible counter 8 and frequency dividing circuit 7 are reset pulses generated by the reset pulse generating circuit 3, and also, brightness/time conversion circuit 5 is actuated by the trailing edge of the reset pulse. The pulse width of single pulses generated by the brightness/time conversion Circuit 5 can be made substantially zero by signals from automatic/-manual transfer circuit 2. The gate control circuit 12 is controlled by the trailing edge of the single pulse and furthermore, memory/call-up transfer gate circuits 10 and 11 are also controlled by memory/call-up transfer signal generated from the gate control circuit 12, thus maintaining the state for addition control while at the same time controlling the reversible counter control circuit 15. Then, if the reflector for the finder goes up and the camera release is further depressed, the shutter starts opening with the timing switch SW3 actuated to open, and standard pulses are generated from the standard pulse generating circuit 4 after delay of a time determined by delay circuit 20. The standard pulses so generated are then applied to frequency dividing circuit 7 by the memory/call-up transfer gate circuit 10. After passing through all of the stages of the frequency dividing circuit 7, they are applied through automatic/manual transfer gate circuit 13 to the reversible counter 8, where they are demultiplied. The standard pulses thus demultiplied are then applied to the No. 2 detection circuit 17 and then by the control terminal, set to its manually set value, to transmit a shutter closing signal to the shutter control circuit 18, which in turn cut off the current of electromagnet Mg for shutter 19 thereby closing shutter 19.

Figure 2B:
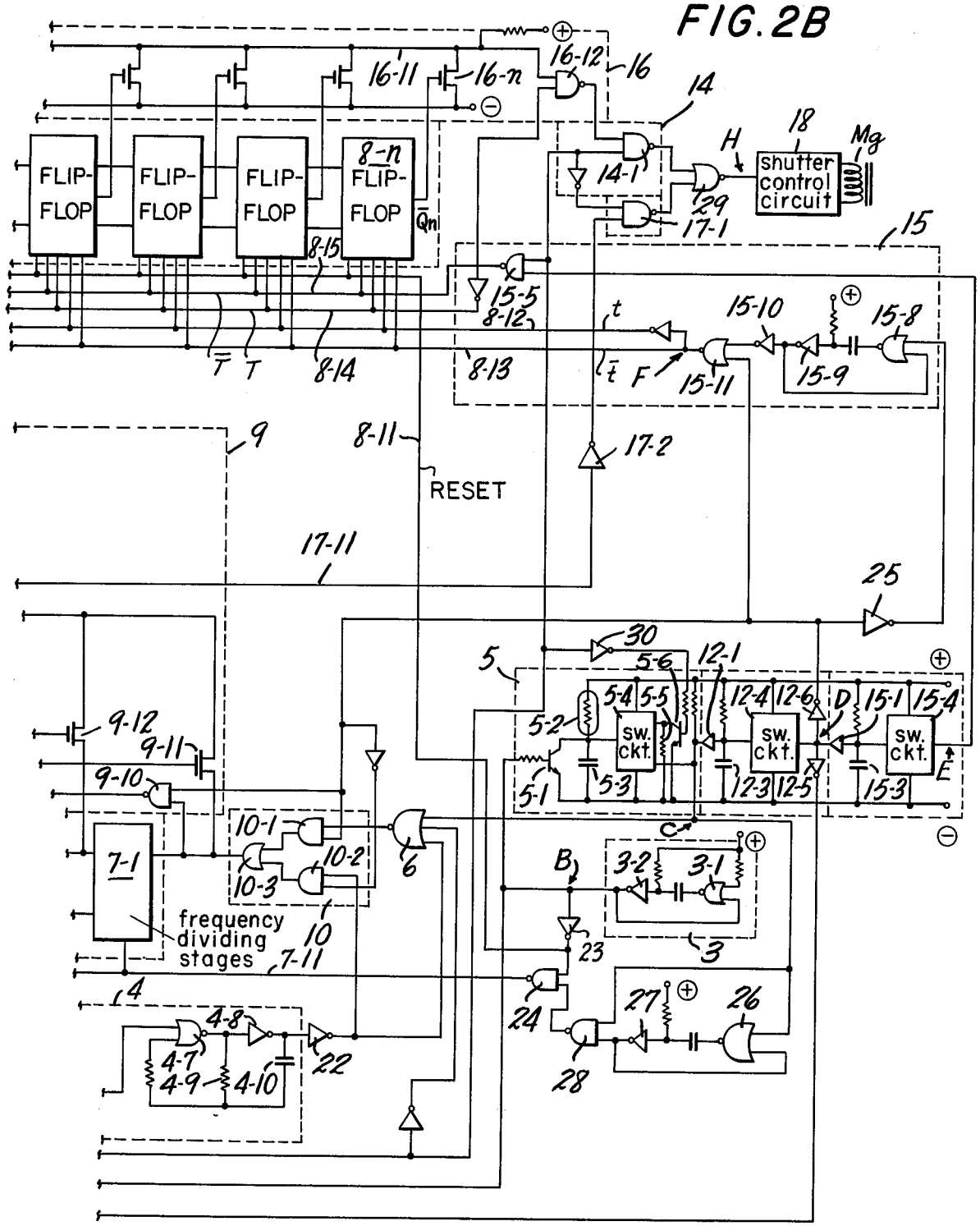

FIG. 2 is a circuit diagram of the embodiment of the invention illustrated in FIG. 1. The display circuit 21 will be explained later. The present invention will be described in conjunction with FIG. 2. The signal level "1" as used herein refers to a high level of the signal level and "0" refers to a low level.

If power switch SW1 is closed at an early stage of the camera shutter release operation, it provides the whole system with a power supply through the delay circuit 1 consisting of well-known circuits as shown. A 1 level signal is applied to control line 2-1 by automatic/manual transfer circuit 2 in the case of the automatic setting mode as will be explained later, and simultaneously, the output G of delay circuit 20, the output C of brightness/time conversion circuit 5, the output D of gate control circuit 12 and the output point E of reversible counter control circuit 15 will become 0. And, the input end H of shutter control circuit 18 comes to be 1, exciting the electromagnet Mg with the shutter 19 through shutter control 18, while 0 signal at the ouput point E of reversible counter control circuit 15 is sent to addition control line 8-15 allowing the addition control signal T to be 1 through the Nand circuit 15-5 one side input terminal of which is connected to control line 2-1, thus making the reversible counter 8 ready for controlling addition operation.

Meanwhile, reset pulse generating circuit 3 develops positive reset pulses at the output B of inverter 3-2. Reset pulse generating circuit 3 comprises a well-known monostable multibrator including the NOR circuit 3-1, inverter 3-2, and associated passive components. While output at B is 1, the output of inverter 23 is 0 which is applied to the reset line 8-11 of the reversible counter 8, causing the reversible counter 8 to reset. The output of inverter 23 is 0 which is applied to the reset line 8-11 of the reversible counter 8, causing the reversible counter 8 to reset. The output of inverter 23 is also applied to NAND circuit 24 which applies at 1 level signal to the reset line 7-11 of frequency dividing circuit 7, to reset the frequency dividing circuit. Thus, resetting is effected when reversible counter 8 has 0 reset and frequency dividing 7 is 1 reset signals applied thereto. Since outout B is 1, the transistor 5-1 of the brightness/time conversion circuit 5 will be rendered conductive and capacitor 5-3 will not be charged. Also, the 1 level signal at the output B is applied as an input through AND circuit 4-1, OR circuit 4-3, AND circuit 4-5 and OR circuit 4-6 of the standard pulse generating circuit 4. The pulse generating unit of the standard pulse generating circuit 4 is well-known pulse generating circuit including NOR circuit 4-7, inverter 4-8, resistor 4-9, capacitor 4-10. Since a 1 level signal is now being applied as input to NOR circuit 4-7, the pulse generating unit will not generate pulses.

When the output B becomes 0 at the termination of the reset pulse, the transistor 5-1 of the brightness/time conversion circuit 5 is intercepted, and capacitor 5-3 starts charging through photoconductive cell 5-2. At the same time, a 0 level signal at output B is applied as an input to the NOR circuit 4-7 of the pulse generating unit through the AND circuit 4-1, OR circuit 4-3, AND circuit 4-5 and OR circuit 4-6 of the standard pulse generating circuit 4, starting the generation of standard pulses. The standard pulses thus generated pass through the AND circuit 10-1 and OR circuit 10-3 of the memory/call-up transfer gate circuit 10, after passing through the inverter 22 and NOR circuit 6.

Figure 3:
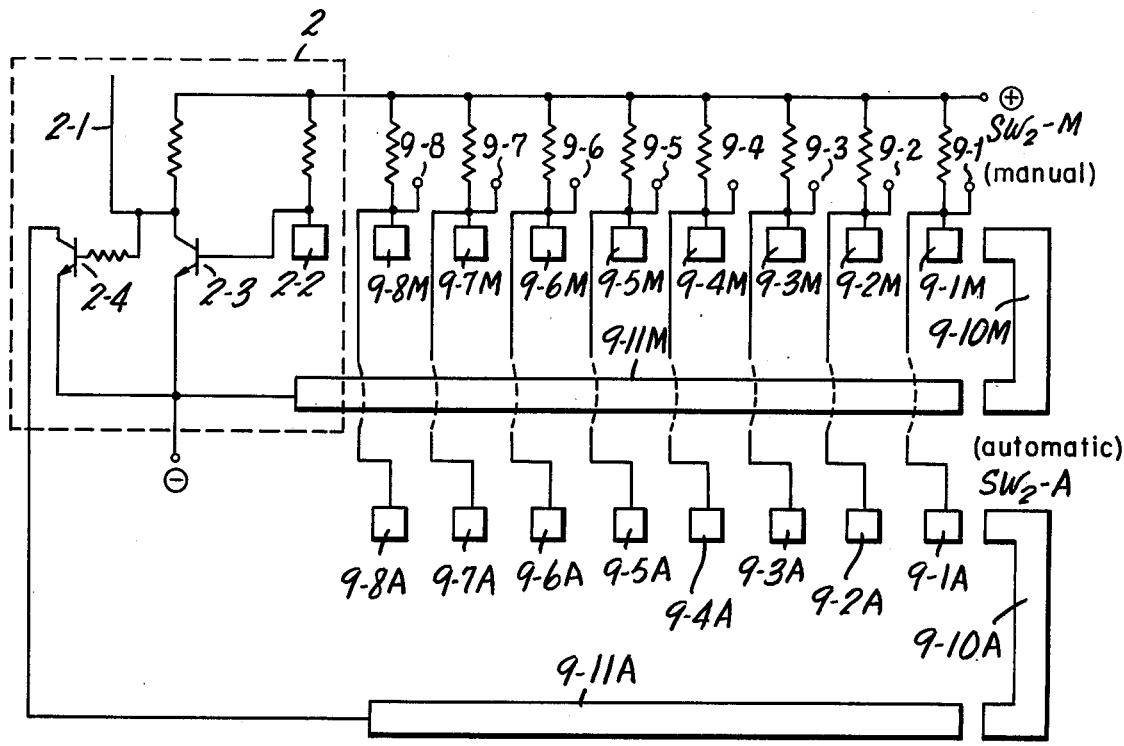
FIG. 3 illustrates the detailed structure of an exposure time change-over switch of the control circuit.

The signal passage transfer circuit 9 has a plurality of control terminals (9-1, 9-2, - - - 9-8) which are respectively connected to the contacts of changeover switch SW2 as shown in FIG. 3. As described later, if one of the contacts of changeover switch SW2 as shown in FIG. 3 is selected to correspond with film sensitivity, diaphragm aperture, etc., the control terminal connected to that contact will be at 0 level, and the corresponding ones of switching elements (9-11, -- 9-14, 9-21, 9-22 -- 9-28) or NOR circuits (9-15, -- 9-18) will be rendered conductive thus permitting signals to pass. If the terminal 9-1 is selected to be at 0 level, for example, switching elements 9-11, 9-21 are rendered conductive and standard pulses pass through the OR circuit 10-3 of memory/call-up transfer circuit 10, then pass through the AND circuit 11-1, and OR circuit 11-3 of memory/call-up transfer circuit 11 through switching element 9-11, and through the AND circuit 13-1, and OR circuit 13-3 of the automatic/manual transfer gate circuit 13. They are then applied as inputs to the reversible counter 8 (pulses which pass through switching element 9-21 will be explained later).

Reversible counter 8 consists of well-known flip-flop counting stages 8-1, 8-2, 8-3, 8-4, -- 8-n connected in cascade as described later, and the terminals $\overline{Q1}$, $\overline{Q2}$, $\overline{Q3}$, $\overline{Q4}$ -- $\overline{Qn}$ of the respective counting stages are connected to the gate terminals of switching elements 16-1, 16-2, 16-3, 16-4 -- 16-n of the No. 1 detection circuit 16. If a number of input pulses are counted and memorized in reversible counter 8, at least one of the terminals $\overline{Q1}$, $\overline{Q2}$ -- $\overline{Qn}$ will be at 0 level therefore, the gate terminals of the switching element of detection circuit 16 which corresponds with the terminal $\overline{Qi}$ at 0 level becomes conductive, and the automatic detection line 16-11 level also become 0. Next, if the charging voltage of capacitor 5-3 of brightness/time conversion circuit 5 reaches a certain predetermined level, the output C of switching circuit 5-4 switches from 0 to 1. The time taken here from the interception of transistor 5-1 to the level change of output C of switching circuit 5-4 depends upon the resistance value of photoconductive cell 5-2 which is subject to change in response to the brightness of a subject and the change on capacitor 5-3. If the brightness of a subject is high the time is short and when the brightness of a subject is low the time is long.

NOR circuit 6 is receptive of the level change of the output C of switching circuit 5-4 so that standard generated from the standard pulse generating circuit are no long applied to reversible counter 8. Because the output point C of the switching circuit 5-4 switches to 1, the monostable multivibrator made up of NOR circuit 26 and inverter 27, is triggered, and a single pulse generated therefrom is sent through NAND circuits 28, 24 to reset line 7-11 to reset the frequency dividing circuit 7 again. Simultaneously, the diode 12-1 of gate control circuit 12 is cut-off and charging of capacitor 12-3 is started. When the charging voltage reaches a predetermined level, the output D of switching circuit 12-4 is inverted from 0 and 1. This 1 level signal is then conducted through inverters 12-5, 12-6 to memory/-call-up transfer gate circuits 10, 11 to provide 0 level signals to AND circuits 10-1, 11-1 and also a 0 level signal to the AND circuit 4-1 of the standard pulse generating circuit 4. Since an input signal of AND circuit 4-2 is also caused to be 1, a 1 level signal is applied as an input through OR circuit 4-3, AND circuit 4-5, OR circuit 15-8 and inverter 15-9, through inverters 12-6 and 25, thus allowing single pulses to be generated. The positive single pulses generted are then sent to the transfer control lines 8-12, 8-13 of reversible counter 8 by the inverter 15-10 and NOR circuit 15-11, to cause transfer control signals $\bar{t}$ to change 1 and $t$ to Q.

Simultaneously with the generation of the single pulses, diode 15-1 is intercepted by inversion of the output point D of switching circuit 12-4, and consequently, capacitor 15-3 starts charging. When its charging voltage reaches its predetermined level, the output E of switching circuit 15-4 is inverted from 0 to 1, which is in turn sent through NAND circuit 15-5 to subtraction control line 8-14, making the subtraction control signal $\bar{T}$ 1, and thus allowing reversible counter 8 to be ready for controlling the subtraction operation. After the reversible counter 8 is shifted from a state for controlling addition to that capable of controlling subtraction, inversion of the output E of the switching circuit 15-4 single pulses generated from the monostable multivibrator composed of NOR circuit 15-8 and inverter 15-9 is ended, $t$ being 0 and $\bar{t}$ being 1. As described later, transfer control signals $t$, $\bar{t}$ are used to prevent any change of the memory values stored in the reversible counter 8 at the time when addition control signal T and subtraction control signal T are transposed.

At the last stage of the release operation, the shutter opens and starts moving, then timing switch SW3 is also opening by the shutter blade opening member (not shown), and the delay circuit 20 is actuated. After a delay of a definite time, output G is inverted from 0 to 1, and a 0 level signal passes through the AND circuit 4-2 and OR circuit 4-3 of standard pulse generating circuit 4 by way of inverter 20-1, and also through AND circuit 4-5 and OR circuit 4-6 and is transmitted to NOR circuit 4-7 to start generating of standard pulses again. The standard pulses thus generated are applied as inputs through inverter 22 and the AND circuit 10-2 and OR circuit 10-3 of memory/call-up transfer gate circuit 10 to the frequency dividing; circuit 7. The standard pulses delivered into the frequency dividing circuit 7 are demultiplied one after another by frequency dividing stages 7-1, 7-2 -- 7-($m$-3) and then provided at the output end of frequency dividing stage 7-($m$-3) and applied as inputs to reversible counter 8 through the AND circuit 11-2 and OR circuit 11-3 of memory/call-up transfer gate circuit 11 and through automatic/manual transfer gate circuit 13.

The number of pulses memorized or stored in the reversible counter 8 is subtracted in turn by the input of pulses demultiplied by frequency dividing circuit 7, and when the memory value becomes zero, all the outputs $\bar{Q}1, \bar{Q}2, \bar{Q}3$ ---$\bar{Q}n$ of respective stages of the reversible counter 8 are 1. Therefore, the gate terminals of all switching elements 16-1, 16-2, 16-3, --- 16-$n$ of the No. 1 detection circuit 16 become 1, being in an enabled state. Since one input of NAND circuit 16-12 of the No. detection circuit 16 becomes 1, its output becomes 0, which controls shutter control circuit 18 through AND circuit 14-1 and OR circuit 29, by cutting the current to electromagnet Mg thereby locking the shutter blade closing member of shutter 19 which releases the shutter blade closing member, thereby closing the shutter. Subtracting the number of pulses memorized after standard pulses generated by the standard pulse generating circuit are demultiplied at the time of call-up or read-out results in an appropriate exposure time in which the pulse frequency at the time of memorizing is made high thereby shortening the memory time, and the pulse frequency at the time of call-up is made by demulitplication.

Next, an explanation is given of the manual setting mode. After a manual set value is selected, as described above, power switch SW1 is closed at the early stage of release operations of the camera and current is then supplied through delay circuit 1, a 0 level signal is sent to respective circuits by control line 2-1 to make the entire system ready for manual setting. As in the automatic setting mode, the output G of delay circuit 20, the output C of brightness/time conversion circuit 5, the output D of gate control circuit 12 and the output E of reversible counter control circuit 15 become 0, and a 1 level signal is applied as an input to NOR circuit 6. Consequently NOR circuit 6 is intercepted. Moreover, the input H of shutter control circuit 18 becomes 1 and excites the electromagnet Mg of shutter 19 through shutter control circuit 18. As a 0 level signal of control line 2-1 is then being applied to one inut terminal of NAND circuit 15-5 of reversible counter control circuit 15, the output level of the control signal of the reversible counter 8 is fixed at 1, to not depend upon the level of the output E of switching circuit 15-4 being in input state with the other side input terminal, accordingly the reversible counter 8 is maintained in the state of controlling addition operation.

The reset pulses are generated from the reset pulse generating circuit 3 in a similar manner as in the case of automatic setting mode. In the case of manual setting mode, the brightness/time conversion circuit 5 is employed to control the gate control circuit 12 by the trailing edge of the single pulse after completion of the single pulse, and as described later, the width of a single pulse should preferably be substantially zero. For this reason, the 0 level signal on control line 2-1 is applied through inverter 30 to the base of transistor 5-6 which is connected, in parallel to the resistor 5-5 to provide a trigger level for the switching circuit 5-4 of brightness/-time conversion circuit 5. The transistor 5-6 is rendered conductive, and the trigger level is lowered, substantially making the widths of single pulses generated zero. (Since a 1 level signal is applied to the control line 2-1 when a automatic setting is made, transistor 5-6 will be rendered in the intercepted state, for a period of time determined by the brightness of a subject). Meanwhile, the signal of output B is 0 at the end of reset pulses delivered as inputs through the AND circuit 4-1, OR CIRCUIT 4-3 and AND circuit 4-5 of standard pulse generating circuit 4 or OR circuit 4-6. Because the output of AND circuit 4-4 is 1, however, the output of OR circuit 4-6 becomes 0, and the input of NOR circuit 4-7 becomes 1. Hence, no standard pulses will be generated.

The brightness/time conversion circuit 5 that actuates by inversion of 1 to 0 at the time when reset pulses are completed inverts the output level of switching circuit 5-4, as described above, after an elapse of time substantially being zero and causes gate control circuit 12-4 to be actuated, changing the memory/call-up transfer gate. By inversion of the output level of switching circuit 5-4 of the brightness/time conversion circuit 5, the monostable multivibrator composed of NOR circuit 26 and inverter 27 is triggered, causing single pulses to be generated and applied through NAND circuits 28, 24 to reset the frequency dividing circuit 4. If the output level of switching circuit 12-4 is inverted from 0 to 1, as in the case of the automatic setting mode, transfer control signals $t, t$ are inverted in response to the inversion, and after an elapse of a definite time, $t, t$ are inverted again. As described above, however, the addition control signal T of reversible counter 8 is not inverted because of NAND circuit 15-5, and the reversible counter 8 will be held in the state for controlling addition operations. Next, as in the case of the automatic setting mode, timing switch SW3 opens after the shutter opening is started and the output G of the delay circuit 20 is inverted from 0 to 1 and is then applied through inverter 20-1 to the AND circuit 4-4 of the standard pulse generating circuit.

A 0 level signal is applied to NOR circuit 4-7 by way of OR circuit 4-6 to start the generation of standard pulses. The standard pulses thus generated are applied to frequency dividing circuit 7 via AND circuit 10-2 and OR cicuit 10-3 of the memory/call-up transfer gate circuit 10. The pulse passing through the dividing stages of frequency dividing circuit 7 are applied through the AND circuit 13-2 and OR circuit 13-3 of automatic/manual transfer gate circuit 13 to the reversible counter 8, where they are demultiplied. At this time, all the paths in the signal passage transfer circuit 9 through which pulses pass are cut off by NAND circuit 9-10 and AND circuit 11-1 under control of signals from gate control circuit 12. One of the control terminals (9-1, 9-2 --- 9-8 of signal passage transfer circuit 9 is also selected in accordance with the value set manually. Therefore, if the terminal 9-2 is selected, for example, switching elements 9-12 and 9-22 are conductive, but the pulses passing the switching elements 9-12 are cut off by the AND circuit 11-1 of the memory/call-up transfer cirucit 11 as set forth above. Applied to the switching element 9-22 are pulses that have passed through the OR circuit 10-3 of memory/call-up transfer gate circuit 10 are demultiplied one after another by frequency dividing sages 7-1, 7-2 --7-($m$-3)of frequency dividing circuit 7 and are then demultiplied by frequency dividing stage 7- ($m$-2) after elapse of manual set time. As a result, if the output Q$m$-2 becomes 1, this 1 level signal is then sent through switching element 9-22 to manual detection line 17-11, and through inverter 17-2 a "0" level signal is applied to the AND circuit 17-1 of the No. 2 detection circuit 17. This allows the output H or OR circuit 29 to be inverted from 1 to 0 to apply a 0 level signal to the shutter control circuit 18, thereby closing the shutter.

FIG. 3 shows the change-over switch SW2 for use in selecting the control terminals 9-1, 9-2, --- 9-8 of signal passage transfer circuit 9. The change-over switch SW2-A is the swtich for introducing determinant factors of parameters of the exposure time other than the brightness of a subject, in the case of the automatic setting mode, and the change-over switch SW2-M is the switch for determining the time of exposure in case of manual setting. An explanation is given to this change-over switch SW2 using FIG. 2 together with FIG. 3. The change-over switch SW2-A comprises a common contact piece 9-11A, change-over contact piece 9-10A and terminals 9-1A, 9-2A - - -9-8A. Similarly, the change-over switch SW2-M comprises common contact piece 9-11M, change-over contact piece 9-10 and terminals 9-1M, 9-2M --- 9-8M. As shown in FIG. 3, the pairs of terminals 9-1A and 9-1M, 9-2A and 9-2M --- 9-8A and 9-8M are connected together, and connected to corresponding ones of these terminal pairs are the control terminals 9-1, 9-2 --- 9-8 of signal passage transfer circuit 9 as shown in FIG. 2. The change-over switch SW2-M is provided with terminal 2-2, and if change-over contact piece 9-10M is short-circuited across terminal 2-2 to connect contact piece 9-11M, transistor 2-3 is then cut off, a 1 level signal is applied to control line 2-1, and transistor 2-4 becomes conductive, causing the common contact piece 9-11A of change-over switch SW2-A to be at a very low potential, and accordingly, the terminal short-circuited to the common contact piece 9-11 by the change-over contact piece 9-10A of change-over switch SW2 becomes "0" and the corresponding terminal becomes 0. Since control line 2-1 is at the 1 level in this case, the respective circuits are actuated for the automatic setting mode. Therefore, by changing the change-over contact piece 9-10A of change-over switch SW-A other factors determinant of the time of exposure other than the brightness of a subject, for example, film sensitivity and diaphragm aperture, can be introduced.

The explanation made above is applied to the case in which the control terminal 9-1 level becomes 0. Now assume when this is set to ASA 100 F 5.6 that eight standard pulses passed through the NOR circuit 6 during the pulse width determined by the brightness/time conversion circuit 5. Each of the eight pulses are applied to the reversible counter 8 and the counting stage 8-4 is inverted. Moreover, if terminal 9-5A and common contact piece 9-11A are short-circuited by the change-over contact piece 9-10A when the setting is made to ASA 100, F8, eight standard pulses generated from the standard pulse generating circuit 4 are applied through NAND circuit 9-10 and NOR circuit 9-15 to the counting stage 8-2 of reversible counter 8 as described in greater detail later, and as counting stage 8-5 is inverted the reversible counter 8 is receptive of inputs equivalent to sixteen pulses. If terminal 9-2A and common contact piece 9-11 A are short-circuited by change-over contact piece 9-10A and control terminal 9-2 becomes 0, assuming that setting is made to ASA 200, F 5.6, eight standard pulses generated from the standard pulse generating circuit 4 pass switching element 9-12 after being demultiplied by the frequency dividing stage 7-1 of frequency dividing circuit 7. The eight pulses are applied to the reversible counter 8 through memory/call-up transfer gate circuit 11 and automatic/manual transfer gate circuit 13, counting stage 8-3 is then inverted, and four pulses are memorized. If the memory value thus memorized is subtracted by the pulses with a definite frequency, the time of exposure in which terminals 9-5A, 9-6A, 9-7A, 9-8A are shortcircuited to be at the "0" level will be 2, 4, 8, 16 times, respectively, by transfer of change-over switch SW2 for the same brightness of a subject, provided that the time of exposure when terminal 9-1A is selected is 1. The time of exposure in the case when terminals 9-2A, 9-3A, 9-4A are short-circuited to the 0 level will be ½, ¼ and ⅛, respectively. Consequently, film sensitivity and diaphragm information can be introduced to determine the exposure time. If the change-over contact piece 9-10M of change-over switch SW2-M is changed from terminal 2-2 to another terminal, transistor 2-3 becomes conductive and control line 2-1 becomes 0 to control various circuits to be in the state of the manual setting mode. Simultaneously, transfer 2-4 is intercepted. Now, assume the terminal 9-2M of change-over switch SW2-M is made O by common contact piece 9-10M so that standard pulses generated from the standard pulse generating circuit are in turn demultiplied through the dividing stages 7-1, 7-2, ---- ---- 7 -($m$-3) as described above, the dividing stage 7-($m$-2) is then inverted. As described above, if the time of exposure at which this is sent through switching element 9-22 to manual detection line 17-11 to generate a shutter closing signal through the No. 2 detection circuit by way of inverter 17-2 is assumed 1, terminal 9-3M is then made being 0 by the change-over contact piece 9-10M. Standard Pulses generated are demultiplied in turn by frequency dividing circuit 7, and after passing the dividing sage 7-($m$-2) and being demultiplied one after another, pulses are further applied to the dividing stage 7-($m$-1). If this dividing stage is inverted, the time of exposure when generating a shutter closing signal, as set forth above, through the switching element 9-23 when it is conductive will be twice. If the terminals 9-4M, 9-5M . . . 9-8M of change-over switch SW2 are selected similarly, the time of exposure will be 4, 8, --- 64 times, respectively, by which manual setting for the time of exposure is possible.

Moreover, in the case of the automatic setting mode or even in case of the manual setting mode, if one control terminal is selected, two pulse paths are always formed. In the case of the automatic setting mode, however, the pulse path when a manual setting is made applied a 0 level signal to one input of AND circuit 17-1 of No. 2 detection circuit 17 and, consequently, causes the output signal of AND circuit 17-1 to be 0, which generates no shutter closing signal. In the case of a manual setting, the pulse path when an automatic setting is made is such that pulses passing therethrough are intercepted by the NAND circuit 9-10 of signal passage transfer circuit 9, the AND circuit 9, the AND circuit 11-1 of memory/call-up transfer gate circuit 11 and the AND circuit 13-1 of automatic/manual transfer gate circuit 13, thereby achieving an appropriate actuation. In the case of a manual setting, narrowing to a substantially zero of the width of single pulses generated from the brightness/time conversion circuit 5 by lowering the trigger level of the brightness/time conversion circuit 5 is implemented in order to prevent the device from causing any false actuation because the gate control circuit 12 is controlled by the trailing edge of the single pulses. Therefore, for low brightness of a subject, the width or duration of a single pulse is long unless the trigger level is changed. If timing switch SW3 happens to open during generation of this single pulse, no passing of pulses occurs through the pulse route, as in the case of the manual setting mode, thereby preventing the false actuation in the device.

Figure 4:
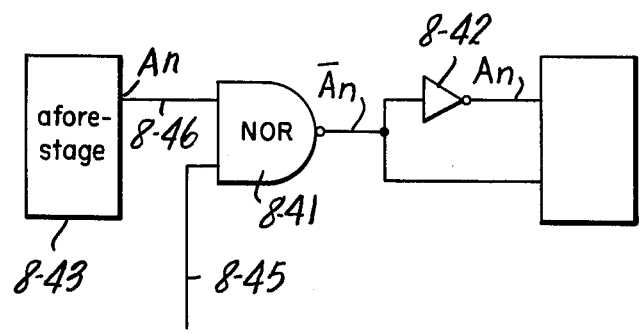
FIGS. 4 and 5 illustrate the detailed circuitry of the stages of a reversible counter used in the control circuit according to the inventon.
Figure 5:
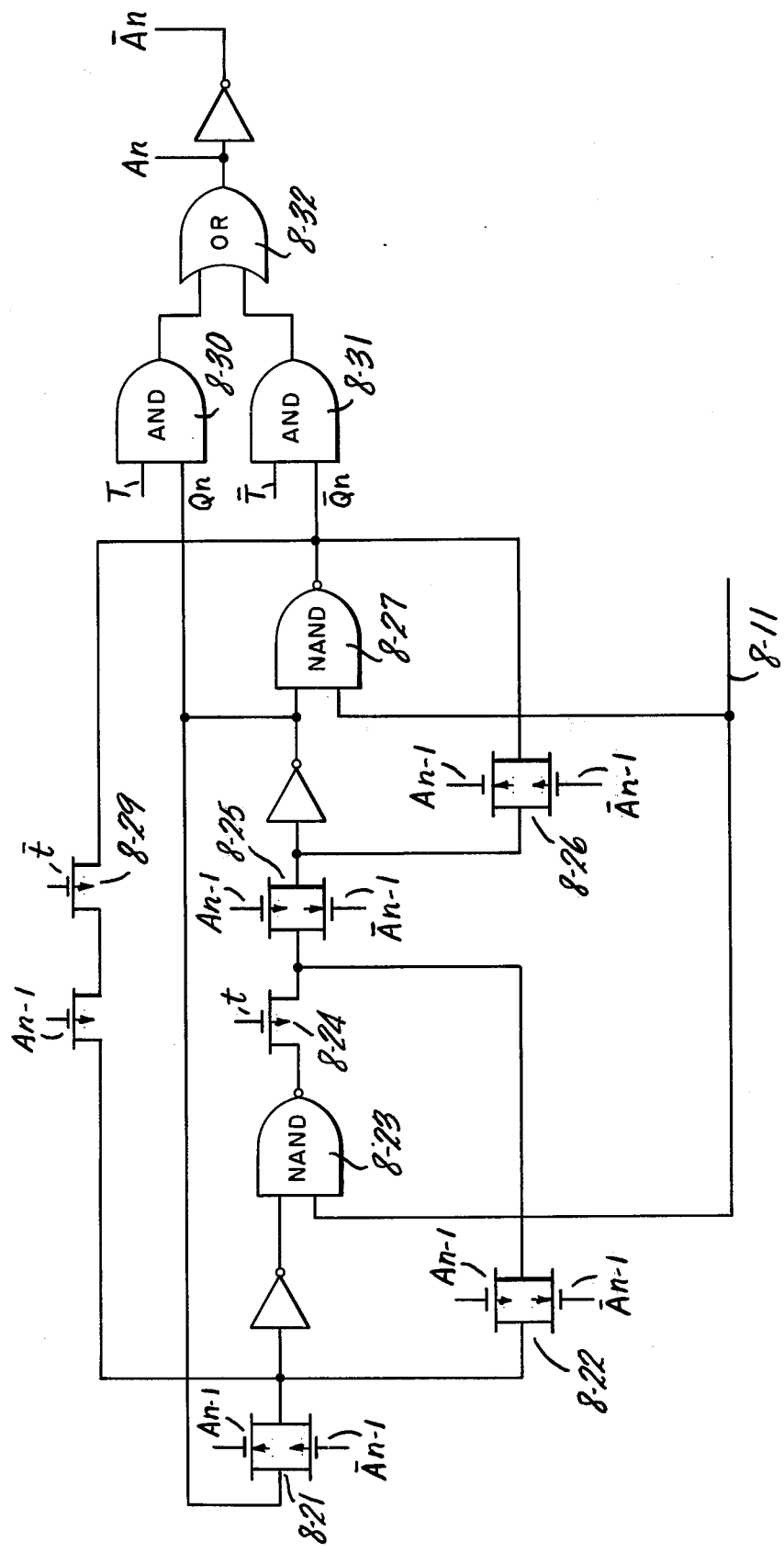

FIG. 4 will be referred to in the description of the method whereby the output signals of NOR circuits 9-15, 9-16, 9-17, 9-18 of signal passage transfer circuit 9 are applied to the counting stages of reversible counter 8, and FIG. 5 shows the internal circuits of said counting stages, both of which will be referred to for explanation. The counting stages of reversible counter 8 are composed of master/slave type flip-flop circuit using transfer gates as shown in FIG. 5. Reset line 8-11 is connected to one side input terminal of NAND circuits 8-23, and 8-27. The addition control signal T is connected to one input of AND circuit 8-30, while subtraction control signal $\overline{T}$ is connected to one input of AND circuit 8-31. Moreover, transfer control signal $\bar{t}$ is connected to the gate terminal of switching element 8-29, and transfer control signal $t$ is also connected to the gate terminal of switchng element 8-24.

When current is supplied, respective control signals, T, $\overline{T}$, $t$, $\bar{t}$ become 1, 0, 0, 1 as was described in conjunction with in FIG. 2, and then, if, a 0 reset pulse from reset line 8-11 is applied as input, the outputs of NAND circuit 8-23, 8-27 become 1. As a result, one input Q$n$ of AND circuit 8-30 becomes 0 and one input end $\overline{Q}n$ of AND circuit 8-31 becomes 1, thus output signals A$n$, $\overline{A}n$ become 0, 1 respectively. $\overline{Q}n$ is connected to the gate end of the switching element for No. 1 detection circuit 16 as aforementioned. Also, the signals A$n$-1, $\overline{A}n$-1 connected to the gate terminals of transfer gates 8-21, 8-22, 8-25, 8-26 are output signals for the afore-stages. If reset pulses are terminated and the reset line becomes 1, pulses from the standard pulse generating circuit 4 are delivered as inputs to the gate terminals of respective transfer gates, where they are demultiplied. The pulses so demultiplied pass through AND circuit 8-30, OR circuit 8-32 and are sent as output signals A$n$ and $\overline{A}n$ to the next stages and then added.

After the output C of switching circuit 5-4 for brightness/time conversion circuit 5 is inverted, transfer control signals $t$, $\bar{t}$ are inverted to 1 and 0, respectively, then switching element 8-29 is rendered conductive and signals T, $\overline{T}$ connected to one input of NAND circuit 8-30 and 8-31 respectively are inverted to 0 and 1, respectively, while switching element 8-24 is intercepted. After that, by inverting the transfer control signals $t$, $\bar{t}$, to 0 and 1 again, a transfer from the addition control state to the subtraction control state is achieved without causing any error in the memory contents. As mentioned before, standard pulses, after being demultiplied by frequency dividing circuit 7 after opening of timing switch SW3, are applied to the gate terminals of transfer gates 8-21, 8-22, 8-25 and 8-26, and pulses from the input Q and AND circut 8-31 pass through AND circuit 8-31, OR circuit 8-32 and are sent as output signals A$n$ and $\overline{A}n$ to the subsequent stages and subtracted NCR circuit 8-41 and inverter 8-42 connected as shown in FIG. 4 are located between counting stages as set forth above. The output A$n$ of afore-stage 8-43 is applied to one input 8-46 of NOR circuit 8-41 and signals from the signal passage transfer circuit 9 as shown in FIG. 2 are applied to the other input 8-45. In the case of the automatic setting mode, one of the control terminals 9-5, 9-6, 9-7, 9-8 becomes 0 at the time of memorizing, which is directly applied through NOR circuit 8-41 between the counting stage of reversible counter 8.

If control terminal 9-6 becomes 0, for example, standard pulses generated by the standard pulse generating circuit 4 are applied to the counting stage 8-3 through NOR circuit 8-41 located between the counting stages 8-2 and 8-3 of reversible counter 8 by way of NOR cirucit 9-16. Then, the output A2 of counting stage 8-2 is applied to input 8-46. Since A2 is then 0, however, standard pulses pass through NOR circuit 8-42 and are delivered to counting stage 8-31. If control terminal 9-6 is 1, moreover, the output of NOR circuit 9-16 is 0, and the input 8-45 of NOR circut 8-41 becomes 0 and signals are transmitted from counting stage 8-2 through NOR circuit 8-41. At the time of call-up, since the output of NAND circuit 9-10 for signal passage transfer circuit 9 becomes 1, the outputs of respective NOR circuits 9-15, 9-16, 9-17 and 9-18 become 0, which does not disturb pulses passing between respective counting stages of the reversible counter 8. Similarly, in the case of the manual setting mode at the time of call-up, respective outputs of NOR circuits 9-15, 9-16, 9-17 and 9-18 become 0. Inverter 8-42 is compensated for phase.

Figure 6:
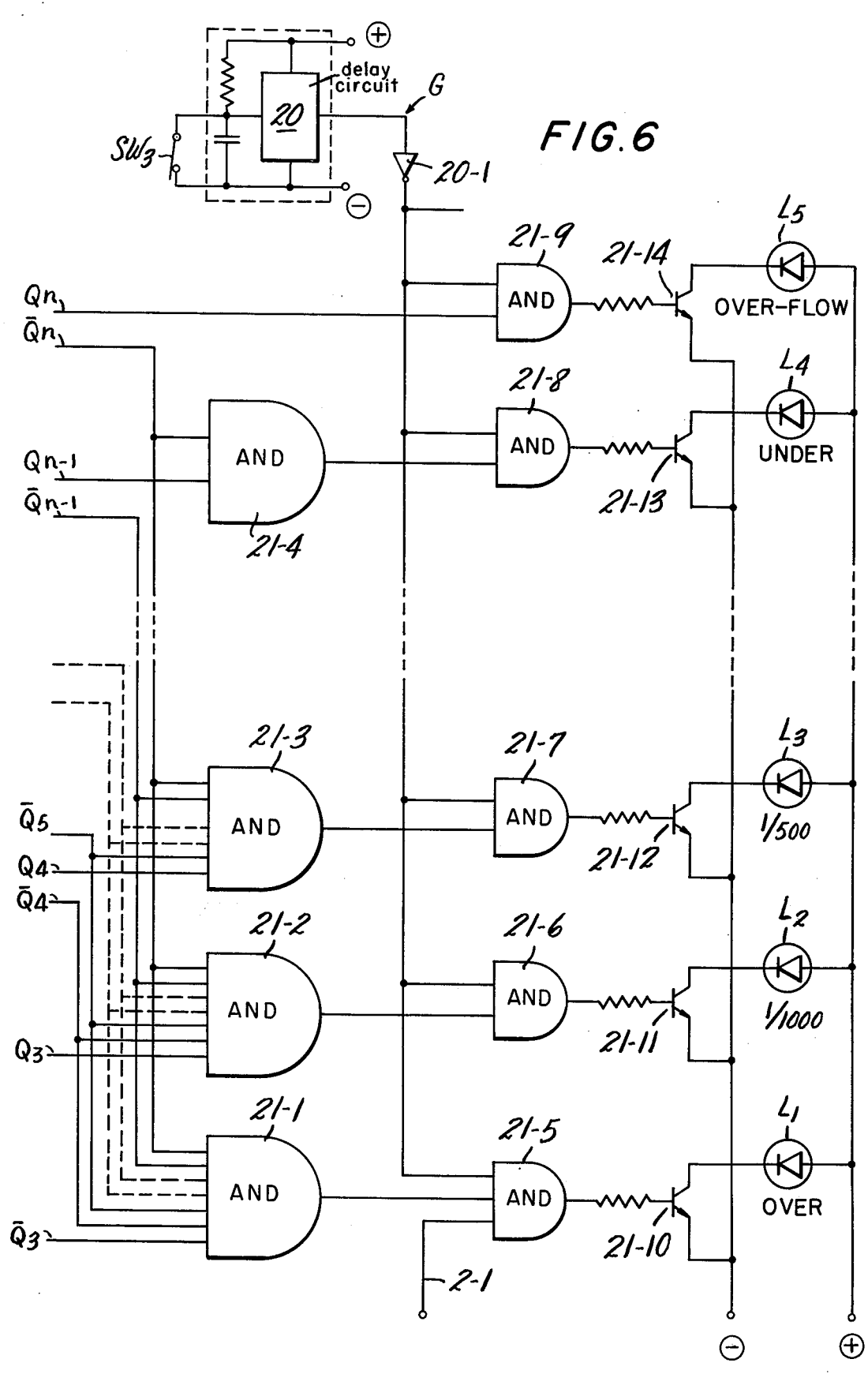
FIG. 6 illustrates a display circuit for displaying exposure time which is incorporated in the control circuit according to the invention.

FIG. 6 is an embodiment of display circuit 21 as shown in FIG. 1. An explanation is given of the operation of the display circuit 21 as shown in FIG. 1. An explanation is given of the operation of the display circuit 21. The input termnals of AND circuits 21-1, 21-2, 21-3 and 21-4 are connected to the terminals Q3, $\overline{Q}$3, Q4, $\overline{Q}$4, Q5—Q$n$-1, $\overline{Q}$$n$-1, $\overline{Q}$$n$ of the respective counting stages of reversible counter 8 as described in conjunction with FIG. 2 and the outputs of respective AND circuits 21-1, 21-2, 21-3, and 21-4 are applied to AND circuits 21-5, 21-6, 21-7 and 21-8. And, the terminal Q$n$ for the last stage of reversible counter is connected to the input of AND circuit 21-9.

The outputs of AND circuits 21-5, 21-6, 21-7, 21-8 and 21-9 are connected through resistors to the bases of transistors 21-10, 21-11, 21-12, 21-13 and 21-14 and display elements L1, L2, L3, L4 and L5, consisting of light emitting diodes, are connected as shown to the collectors of the transistors. Control line 2-1 is also connected to the AND circuit 21-5. The display is arranged such that L1 is lighted for "OVER" display to show overexposure, L2 is lighted for "1/000 S" display, L3 is lighted for "1/500 S", L4 is lighted for "UNDER" display to show hand vibration and L5 is lighted for UNDER display to show hand vibration and L5 is lighted for "OVERFLOW" to show exposure limits. The signals from output G of delay circuit 20 are delivered to input terminals of AND circuits 21-5, 21-6, 21-7, 21-8 and 21-9 through inverted 20-1.

By depressing the release button, in the case of the automatic setting mode, a 1 level signal is applied to control line 2-1 as set forth above $\overline{Q1}$, $\overline{Q2}$, $\overline{Q3}$, $\overline{Q4}$, $\overline{Q5}$ --- $\overline{Qn}$ all become 1 and Q1, Q2, Q3, Q4 --- Q$n$ all become 0, when the reversible counter 8 is reset. Consequently, the output of AND circuit 21-1 becomes 1 and the outputs of AND circuits 21-2, 21-3, and 21-4 become 0. Meanwhile, timing switch SW3 is still being closed, the output G of delay circuit 20 is 0, and a 1 level signal is applied to AND circuits 21-5, 21-6, 21-7, 21-8 and 21-9 through inverter 20-1. Therefore, only the output of AND circuit 21-5 becomes 1 thus rendering transistor 21-10 conductive thereby lighting L1 to displaying "OVER", while the other display elements L2, L3, L4 and L5 are not lighted.

Now assume four pulses are applied to reversible counter 8, by which 1/000 S exposure time is obtained. Then the level of Q3 becomes 1 and $\overline{Q}$3 becomes 0. As a result, the output of AND circuit 21-2 becomes 1 and the output of AND circuit 21-6 also comes to be 1, thereby rendering transistor 21-11 conductive and L2 is lighted displaying "1/1000 S2". The input $\overline{Q}$3 of AND circuit 21-1 is applied with a "0" level signal in this case, and the output of AND circuit 21-1 becomes 0, thereby causing L1 to be out. If eight pulses are delivered to the reversible counter 8 the level of Q4 becomes 1 and $\overline{Q}$4 becomes 0. Hence, only the output of AND circuit 21-7 becomes 1, thus rendering transistor 21-19 conductive. Then, L3 is lighted displaying "1/5000 S". Similarly, shutter speed is displayed corresponding to the number of pulses applied to reversible counter 8, and if pulses are applied to the last stage 8-$n$ of reversible counter 8, L5 is lighted displaying OVERFLOW.

Furthermore, after timing switch SW3 is opened during camera release operation, the output G of delay circuit 20 is inverted from 0 to 1 and the signals generated are applied to AND circuit 21-5, 21-6, 21-7 and 21-8 and 21-8 and 21-9 through inverter 20-1. Consequently, all of the outputs of the respective AND circuits become 0 thereby extinguishing any of the light emitting diodes which are lighted. In the case of the manual setting mode, since reversible counter 8 is reset unitl the output G of delay circuit 20 is inverted, after the opening of timing switch SW3, only the output of AND circuit 21-1 of display circuit if 1. Although this 1 level signal is applied to AND circuit 21-5, control line 21 is also at the same level as the input state of AND circuit 21-5. Since the control line 2-1 is 0 at the time of manual setting as described above, it output end is 0 and therefore none of the light emitting diodes will be lighted.

Figure 7:
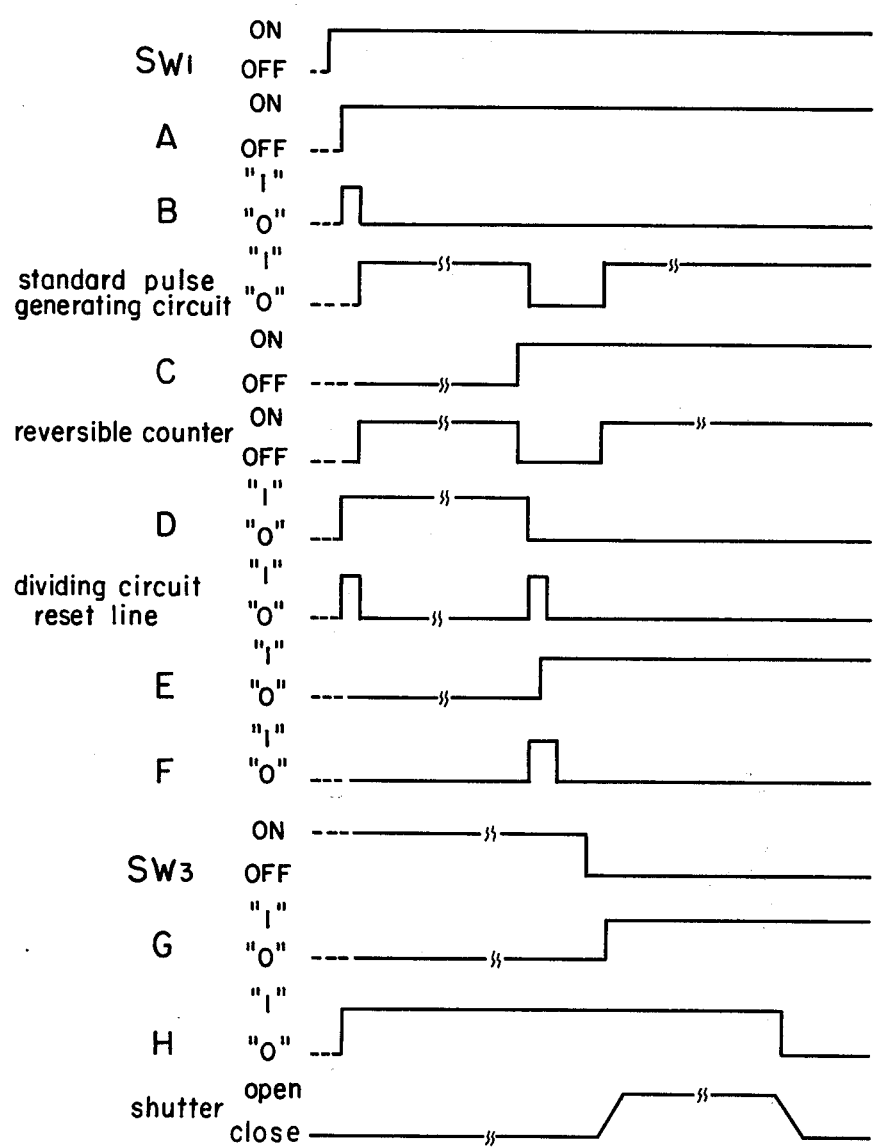
FIGS. 7 and 8 are timing diagrams which show the signal waveforms generated during the operation of the shutter control circuit according to the invention.
Figure 8:
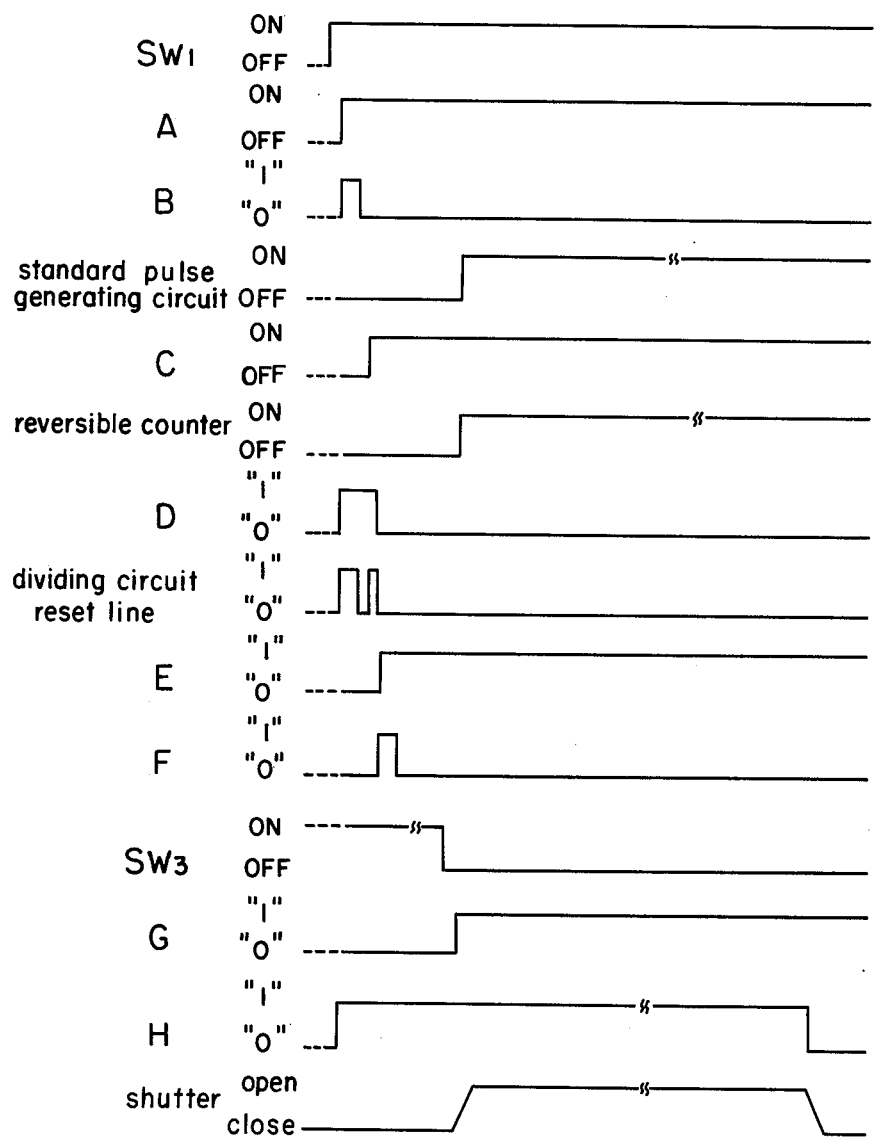

FIG. 7 is a waveform diagram showing the actuating state and signal levels of the respective switches, circuits, control terminals, shuttter, etc, for the case of the automatic setting mode and, FIG. 8 shows the same in the case of the manual setting mode. A, B, C, D, E, F, G, H show signal levels at respective points of A, B, C, D, E, F, G, H in FIG. 2, and the reset line in the frequency dividing circuit waveform shows signal levels at the reset line 6–11 in FIGS. 2.

We claim:
1. In a shutter control circuit of the type having a brightness-time conversion circuit for developing an output pulse having a duration representative of an exposure time; a standard pulse generating circuit for generating standard pulses at a certain rate; and a reversible counter operable in an addition mode for counting standard pulses, and operable in a subtraction mode for reading-out the number of counter pulses; the improvement which comprises; first means for enabling said counter in the addition mode and for applying standard pulses to said reversible counter for the duration of the brightness-time conversion circuit output pulse, whereby the number of standard pulses counted is representative of an exposure time; means for enabling said counter in the subtraction mode and reading-out the number of standard pulses counted to control the exposure time; second means for enabling said counter in the addition mode and operable for applying a selectable number of the standard pulses to aid reversible counter; and means for enabling said counter in the subtraction mode and for reading-out the selected number of standard pulses counted to control the exposure time, whereby the exposure time is selectable by selecting the number of standard pulses applied to said reversible counter.

2. In a shutter control circuit according to claim 1, wherein said brightness-time conversion circuit comprises means, coactive with said second means for enabling said counter in the addition mode and operable for applying a selectable number of standard pulses, for reducing the duration of the output pulse of said brightness-time conversion circuit substantially to zero, whereby said brightness-time conversion circuit is rendered ineffective to determine the exposure time.

* * * * *